US012322831B2

(12) United States Patent
Xu et al.

(10) Patent No.: US 12,322,831 B2
(45) Date of Patent: Jun. 3, 2025

(54) ELECTROLYTE MEMBRANE FOR AN ALKALI METAL BATTERY

(71) Applicants: Enpower Greentech, Inc., New York, NY (US); Board Of Regents, The University Of Texas System, Austin, TX (US)

(72) Inventors: Henghui Xu, Austin, TX (US); Yutao Li, Austin, TX (US); Yong Che, Ann Arbor, MI (US); John B. Goodenough, Austin, TX (US)

(73) Assignees: Enpower Greentech, Inc., New York, NY (US); Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 17/486,597

(22) Filed: Sep. 27, 2021

(65) Prior Publication Data
US 2022/0115739 A1 Apr. 14, 2022

Related U.S. Application Data

(60) Provisional application No. 63/084,068, filed on Sep. 28, 2020.

(51) Int. Cl.
*H01M 50/446* (2021.01)
*H01M 4/62* (2006.01)
*H01M 50/403* (2021.01)

(52) U.S. Cl.
CPC ......... *H01M 50/446* (2021.01); *H01M 4/625* (2013.01); *H01M 50/403* (2021.01)

(58) Field of Classification Search
CPC ... H01M 50/446; H01M 50/403; H01M 4/625
See application file for complete search history.

(56) References Cited

U.S. PATENT DOCUMENTS

2020/0360866 A1* 11/2020 Zhou ................. C08J 7/043
2022/0352562 A1* 11/2022 Cho ................... H01M 50/414

FOREIGN PATENT DOCUMENTS

| CN | 107834104 A | * | 3/2018 | ........ H01M 10/0525 |
|---|---|---|---|---|
| CN | 109065889 A | | 12/2018 | |
| CN | 109755640 A | | 5/2019 | |
| CN | 110994017 A | * | 4/2020 | ........ H01M 10/0525 |
| CN | 108448169 B | * | 5/2020 | ........ H01M 10/0525 |

OTHER PUBLICATIONS

Yang J, Wang X, Zhang G, Ma A, Chen W, Shao L, Shen C and Xie K High-Performance Solid Composite Polymer Electrolyte for all Solid-State Lithium Battery Through Facile Microstructure Regulation. Front. Chem. 7:388. (Year: 2019).*

(Continued)

*Primary Examiner* — Brian R Ohara
*Assistant Examiner* — Emily Elizabeth Freeman
(74) *Attorney, Agent, or Firm* — Reising Ethington P.C.

(57) ABSTRACT

The present disclosure relates to an electrolyte membrane for an alkali metal or an alkali metal ion battery, comprising: a composite membrane comprising an ionically conductive polymer; an alkali metal salt; and a filler comprising a carbon nitride nanosheet, an oxygenated carbon nitride nanosheet or a combination thereof.

15 Claims, 10 Drawing Sheets

(56) References Cited

OTHER PUBLICATIONS

Hu, Jiulin, et al.; Nanostructured Carbon Nitride Polymer-Reinforced Electrolyte to Enable Dendrite-Suppressed Lithium Metal Batteries; ACS Applied Materials & Interfaces; Mar. 14, 2017 (11 pages).
Sun, Zongjie, et al.; g-C3N4 nanosheets enahced solid polymer electrolytes with excellent electrochemical performance, mechanical properties, and thermal stability; Journal of Materials Chemistry A; Apr. 3, 2019 (8 pages).
Written Opinion & International Search Report for PCT/US2021/052361 dated Jan. 19, 2022 (10 pages).
Preliminary Report on Patentability for PCT/US2021/052361 dated Apr. 6, 2023 (6 pages).

\* cited by examiner

ELECTROLYTE MEMBRANE FOR AN ALKALI METAL BATTERY

CROSS-REFERENCE TO RELATED APPLICATIONS

This application claims the benefit of U.S. Provisional Application No. 63/084,068, filed Sep. 28, 2020.

STATEMENT REGARDING FEDERALLY SPONSORED RESEARCH

None.

STATEMENT REGARDING JOINT DEVELOPMENT AGREEMENT

The claimed invention was made by, on behalf of, and/or in connection with one or more of the following parties to a joint development agreement: Enpower Greentech Inc. and University of Texas at Austin. The agreement was in effect on and before the date the claimed invention was made, and the claimed invention was made as a result of activities undertaken within the scope of the agreement.

BACKGROUND OF THE DISCLOSURE

1. Field of the Disclosure

The present disclosure generally relates to an electrolyte membrane. More particularly, the present disclosure relates to a polymer-based electrolyte membrane with a filler comprising a carbon nitride nanosheet, an oxygenated carbon nitride nanosheet, or combinations thereof.

2. Description of the Related Art

The development of high safety and high-energy-density lithium-metal batteries is in very high demand to meet the ever-increasing market of intelligent electronics, electric vehicles and grid-scale energy-storage systems. Replacing current liquid organic electrolytes with safe solid state electrolytes is at present the most viable and valid strategy to achieve this development. Compared to ceramic electrolytes, the polymer electrolytes such as poly (ethylene oxide) (PEO) have been extensively investigated. The PEO electrolytes have shown low interfacial resistance, high flexibility, and simple processability. However, PEO-based polymer electrolytes still have not been commercialized because of their detrimental drawbacks such as: 1) low ionic conductivity at room temperature, which consumes extra energy to heat the electrolyte above 50° C.; 2) poor capability of suppressing lithium-dendrite growth especially at high current densities; 3) a low thermal stability, which causes short-circuit thermal runaway; and 4) a narrow electrochemical window, which restricts their use in pairing with a high-voltage Nickel-Manganese-Cobalt (NMC)-based cathode.

Therefore, it remains highly desirable to develop alternative polymer electrolyte systems with enhanced performances at room temperature. A polyvinylidene difluoride (PVDF)-based polymer electrolyte is receiving increasing attention due to its high polarization in dissociating Lithium salt at room temperature. Specifically, PVDF-based electrolytes with $Li^+$-conductive fillers like $Li_7La_3Zr_2O_{12}$ (LLZO) exhibit a high $Li^+$-conductivity at room temperature, good fireproof property, and a wide electrochemical window. The increased ionic conductivity mainly comes from the interfacial interaction between the LLZO fillers and the PVDF/LiTFSI matrix rather than from the contribution of the Li-conductive LLZO itself. Therefore, quite a large amount of LLZO (~30 wt. %) is required in the PVDF-based composite electrolyte to provide enough interfacial active areas to sufficiently interact with PVDF/LiTFSI (Lithium bis(trifluoromethanesulfonyl)imide) matrix, which greatly sacrifices the energy density of the electrolyte. In addition, PVDF is not stable with lithium metal and degrades gradually during cycles when in contact with the Li-metal anode, which severely restricts its long-term cyclability. As $Li^+$-conductive ceramic fillers contribute a negligible amount to the total conductivity of the polymer electrolyte, inert fillers with a high surface area and a strong interaction with PVDF/LiTFSI matrix are expected to work well in enhancing the ionic conductivity of the electrolyte.

SUMMARY OF THE DISCLOSURE

In a first aspect of the present disclosure, provided herein is an electrolyte membrane for an alkali metal ion battery, comprising: a matrix comprising an ionically conductive polymer; an alkali metal salt; and a filler comprising a carbon nitride nanosheet, an oxygenated carbon nitride nanosheet, or a combination thereof.

Throughout the present specification and claims we will discuss a carbon nitride nanosheet, an oxygenated carbon nitride nanosheet and combinations thereof. It is to be understood, as is clear to one of skill in the art, that this does not mean a single sheet of the material, instead the material comprises a plurality of sheets as it is utilized in the present invention. Thus, for convenience it is referred to as a carbon nitride nanosheet, an oxygenated carbon nitride nanosheet and combinations thereof despite being comprised of a plurality of sheets of these materials. In addition, the preferred embodiments of the present disclosure do not include in the electrolyte membrane any non ionically conductive polymers, preferably only ionically conductive polymers are used in the formation of electrolyte membranes according to the present disclosure.

In one embodiment of the first aspect of the present disclosure, the carbon nitride is graphitic carbon nitride (g-$C_3N_4$).

In one embodiment of the first aspect of the present disclosure, the filler comprises an oxygenated carbon nitride (OCN) nanosheet.

In some embodiments of the first aspect of the present disclosure, the filler comprises oxygenated carbon nitride nanosheet and is present in an amount of from about 0.5% to 10% by weight, more preferably in an amount of from about 2% to 5% by weight based on the total weight of the conductive polymer. In an illustrative embodiment of the present disclosure, the amount of the oxygenated carbon nitride nanosheet is about 2 wt % by weight based on the total weight of the conductive polymer.

In one embodiment of the first aspect of the present disclosure, the carbon nitride nanosheet, oxygenated nitride nanosheet and combinations thereof are inert to alkali metal ions and have a high surface area above 100 $m^2$/g. in an example of the present disclosure, the surface area is around 171 $m^2$/g. The carbon nitride nanosheet, oxygenated carbon nitride nanosheet and combinations thereof are sheet-like and porous.

In one embodiment of the first aspect of the present disclosure, the carbon nitride nanosheet, oxygenated carbon nitride nanosheet and combinations thereof are dispersed throughout the matrix. In an illustrative embodiment of the present disclosure, the carbon nitride nanosheet, oxygenated carbon nitride nanosheet or combinations thereof are uniformly dispersed throughout the matrix.

In one embodiment of the first aspect of the present disclosure, the polymer is polyvinylidene difluoride (PVDF) or polyacrylonitrile (PAN).

In one embodiment of the first aspect of the present disclosure, wherein the alkali metal salt is selected from a group consisting of, but not limited to, LiFSI (Lithium bis(fluorosulfonyl)imide), LiTFSI (Lithium bis(trifluoromethanesulfonyl)imide), LiClO$_4$ (Lithium perchlorate), NaFSI (Sodium bis(fluorosulfonyl)imide), NaTFSI (Sodium bis(trifluoromethanesulfonyl)imide) and NaClO$_4$ (Sodium perchlorate).

In one embodiment of the first aspect of the present disclosure, an amount of the alkali metal salt is present in a range of from about 50%-80%—by weight based on the total weight of the conductive polymer.

In a second aspect of the present disclosure, provided herein is a method of preparing an electrolyte membrane for an alkali metal ion battery, comprising: mixing a matrix comprising an ionically conductive polymer, an alkali metal salt, and a solvent to obtain a composition; combining the composition with a filler comprising a carbon nitride nanosheet, an oxygenated carbon nitride nanosheet or a combination thereof to obtain a suspension; molding and drying the suspension to form an electrolyte membrane.

In a third aspect of the present disclosure, provided herein is an alkali metal ion battery comprising: an anode; a cathode; and the electrolyte membrane according to the present disclosure disposed between the anode and the cathode.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF THE DISCLOSURE

Figure 1:
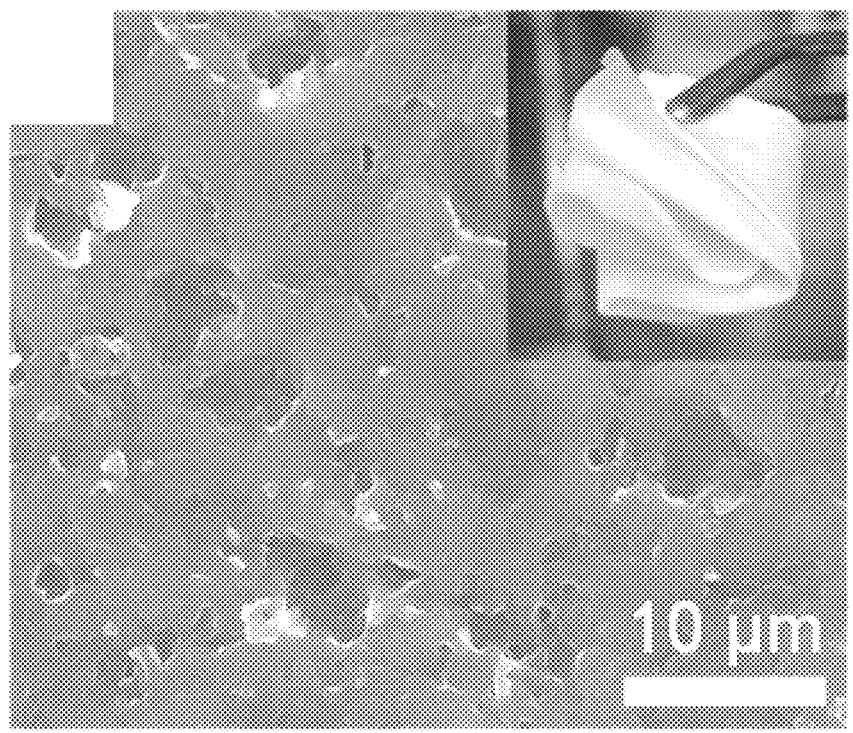
FIG. 1 is a scanning electron microscopy (SEM) image of the surface of a PVDF/LiTFSI/OCN membrane according to one illustrative embodiment as described herein, wherein the inset picture shows the membrane's excellent flexibility when it is rolled on a glass tube.

Several aspects of the disclosure are described below with reference to example applications for illustration. It should be understood that numerous specific details, relationships, and methods are set forth to provide a full understanding of the disclosure. One having ordinary skill in the relevant art, however, will readily recognize that the disclosure can be practiced without one or more of the specific details or with other methods. The present disclosure is not limited by the illustrated ordering of acts or events, as some acts may occur in different orders and/or concurrently with other acts or events.

Unless otherwise defined, all technical and scientific terms used herein have the same meaning as commonly understood by one of ordinary skill in the art to which this disclosure belongs. The terminology used herein is for the purpose of describing particular embodiments only and is not intended to be limiting of the disclosure. As used herein, the singular forms "a", "an" and "the" are intended to include the plural forms as well, unless the context clearly indicates otherwise.

Furthermore, to the extent that the terms "including", "includes", "with", or variants thereof are used in either the detailed description and/or the claims, such terms are intended to be inclusive in a manner similar to the term "comprising".

The term "about" means within an acceptable error range for the particular value as determined by one of ordinary skill in the art, which will depend in part on how the value is measured or determined, i.e., the limitations of the measurement system. For example, "about" can mean within 1 or more than 1 standard deviation, per the practice in the art. Alternatively, "about" can mean a range of up to ±20%, preferably up to ±10%, more preferably up to ±5%, and most preferably still up to ±1% of a given value. Alternatively, particularly with respect to biological systems or processes, the term can mean within an order of magnitude, preferably within 5-fold, and more preferably within 2-fold, of a value. Where particular values are described in the application and claims, unless otherwise stated the term "about" meaning within an acceptable error range for the particular value should be assumed.

The term "g-$C_3N_4$" refers to graphitic carbon nitride, which is a family of carbon nitride compounds with a general formula near to $C_3N_4$ and two major substructures based on heptazine and poly(triazine imide) units.

The alkali metal salt may be any suitable alkali metal salt which is available in the art, including but not limited to LiTFSI, LiFSI, LiClO$_4$, NaTFSI, NaFSI, NaClO$_4$.

The polymer may be any suitable ionically conductive polymer which is available in the art, including but not limited to polyvinylidene difluoride (PVDF), polyacrylonitrile (PAN), and poly(ethylene oxide) (PEO).

The solvent for preparing the electrolyte membrane of the present disclosure may be any suitable solvent which is available in the art, including but not limited to N-methyl-2-pyrrolidone (NMP) and Dimethylformamide (DMF).

According to a further aspect of the present disclosure, an alkali metal ion battery may comprise: an anode; a cathode; and an electrolyte membrane of the present disclosure disposed between the anode and the cathode.

The alkali metal ion battery may be a solid-state battery and the electrolyte membrane may be a solid-state electrolyte.

The anode comprises a metal or metal alloy electrode comprising any suitable alkali metal, which is available in the art. In an illustrative embodiment of the present disclosure, the anode is a lithium metal electrode. Alternatively, the anode may be sodium metal or sodium alloy electrode.

The cathode may be any cathode, including nickel-rich high-voltage cathodes suitable for alkali metal or alkali ion batteries, which is available in the art. In an illustrative embodiment of the present disclosure, the cathode is $LiNi_{0.8}Mn_{0.1}Co_{0.1}O_2$ (NMC811).

EXAMPLES

Example 1. Preparation of OCN Nanosheet (2D g-$C_3N_4$ Nanosheet)

The skilled in the art should understand that OCN nanosheet material is commercially available, and may be prepared by any suitable method which is known in the art. For example, a method for OCN nanosheet preparation was reported in the reference She, X.; Wu, J.; Thong, J.; Xu, H.; Yang, Y.; Vajtai, R.; Lou, J.; Liu, Y.; Du, D.; Li, H.; Ajayan, P. M. Nano Energy 2016, 27, 138.

In the present example, the OCN nanosheet was prepared through a modified layer-by-layer thermal oxidation cutting process as reported in the reference M. Wang, Z. Li, L. Tian, Y. Xie, J. Han, T. Liu, C. Jin, Z. Wu, International Journal of Hydrogen Energy 2019, 44, 4102. In a first step, thermal condensation of melamine, 5 ml of diluted nitric acid (20%) and 3 g melamine were well-mixed in hot water and then the mixture was cooled down to room temperature to produce a bulk $C_3N_4$ powder precipitate, which was a yellowish precipitate with a surface area of about 25 m$^2$/g. The collected precipitate was sintered in an air furnace under three calcination processes performed sequentially: 550° C. for 2 h at 10° C./min, then 550° C. for 1 h at 5° C./min, and finally 550° C. for 1 h at 2° C./min. Following this process an OCN nanosheet was obtained. This is the thermal exfoliation process discussed in the present specification. The obtained OCN nanosheet is a two-dimensional (2D) g-$C_3N_4$ nanosheet, which is a white, fluffy, ultra-light powder and it has a high porosity and a high surface area.

It is much easier to prepare OCN than conventional ceramic fillers such as LLZO and lithium lanthanum titanate (LLTO), which are currently used in a PVDF/LiTFSI electrolyte, and the precursor of the OCN nanosheet material is very cheap.

The surface area of the OCN nanosheet prepared according to the present disclosure is 171 m$^2$/g while the bulk particles of g-$C_3N_4$ only have a surface area of 25 m$^2$/g.

Example 2. Preparation of PVDF/LiTFSI/OCN Membrane

In this example, the disclosure provides an illustrative embodiment for a PVDF/LiTFSI/OCN membrane with different amounts of OCN filler, as well as the preparation method thereof. The skilled in the art should understand that the PVDF/LiTFSI/OCN membrane may also be prepared by any suitable method which is available in the art.

In this example, the PVDF/LiTFSI/OCN membrane was prepared by a facile solution-cast method through vacuum-drying a solution. First, 1 g of polyvinylidene difluoride (PVDF, HSV900 provided by Arkema Inc.) and 0.8 g Lithium bis(trifluoromethanesulfonyl)imide (LiTFSI) (Sigma-Aldrich) were dissolved in N-methyl-2-pyrrolidone (NMP) solvent (Sigma-Aldrich) to obtain a composition; the OCN nanosheet (2D g-$C_3N_4$ nanosheet as prepared by the process of Example 1, 20 mg) was then added into the clear PVDF/LiTFSI solution to obtain a suspension of PVDF/LiTFSI/OCN. After stirring for 5 h, the PVDF/LiTFSI/OCN suspension was poured into a polytetrafluoroethylene dish, and dried in a vacuum oven at 60° C. for 48 h to obtain a PVDF/LiTFSI/OCN membrane (Sample 1). The PVDF/LiTFSI/OCN membrane was then transferred from the vacuum oven to a glove box and stored for use.

The obtained Sample 1 is a PVDF/LiTFSI/OCN membrane comprising a PVDF matrix, LiTFSI and 2D g-$C_3N_4$ nanosheet as the filler, wherein the amount of the g-$C_3N_4$ nanosheet was about 2% by weight based on the total weight of the PVDF.

As shown in FIG. 1, the obtained Sample 1 is mechanically robust and flexible being able to fold and conform to the glass tube as shown in the inset photograph. No OCN nanosheet aggregates are seen on the surface of membrane in the SEM image, indicating that the OCN nanosheet had dispersed uniformly in the PVDF/LiTFSI matrix.

The PVDF/LiTFSI/OCN membranes with 5 wt % OCN and 10 wt % OCN were also prepared in the same manner as Sample 1 except for the amounts of OCN nanosheet added into the PVDF/LiTFSI solution. For the PVDF/LiTFSI/OCN membrane with 5 wt % OCN (Sample 2), 50 mg of OCN nanosheet was added to the clear PVDF/LiTFSI solution to obtain a suspension. For the PVDF/LiTFSI/OCN membrane with 10 wt % OCN (Sample 3), 100 mg of OCN nanosheet was added to the clear PVDF/LiTFSI solution to obtain a suspension.

Finally, a PVDF/LiTFSI membrane without OCN material added was prepared as a control sample in the same manner as Sample 1 except that no OCN nanosheet was added to the clear PVDF/LiTFSI solution.

Example 3. Electrochemical Characteristics Evaluation of Electrolyte Membrane 1. X-Ray Diffraction (XRD)

X-ray diffraction (XRD) was performed on the electrolyte membrane Sample 1, the control sample membrane prepared in Example 2, a pure OCN nanosheet prepared in Example 1, and a pure PVDF membrane. The results are shown in FIG. 2 which characterize the detailed structure and crystallinity degree of the membranes and materials.

Figure 2:
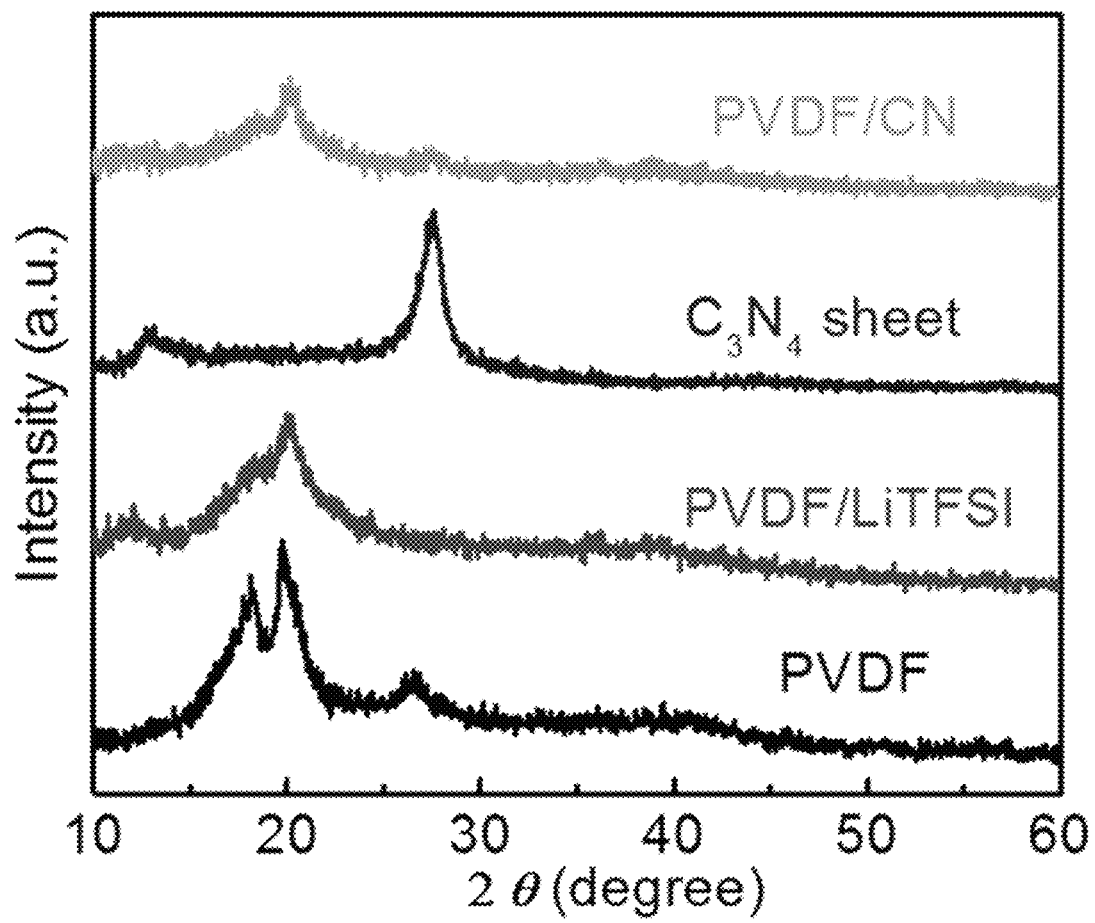
FIG. 2 shows x-ray diffraction (XRD) patterns of an OCN nanosheet material alone, a PVDF/LiTFSI membrane, a PVDF/LiTFSI/OCN membrane with 2 wt % OCN, and a PVDF membrane alone.

As shown in FIG. 2, the XRD pattern of the control sample PVDF/LiTFSI membrane without OCN, labeled PVDF/LiTFSI second trace from the bottom, shows non-detectable peaks of LiTFSI salt and much weaker peaks of the PVDF polymer, which indicates that LiTFSI is well dissolved in the PVDF polymer and the crystallinity degree of the PVDF was reduced. The Sample 1 PVDF/LiTFSI/OCN membrane with 2 wt % OCN, labeled PVDF/LiTFSI/OCN top trace, displays a further reduced degree of crystallinity in the PVDF, which indicates that OCN breaks up the regularity of the PVDF chains and converts the structure of the PVDF from crystalline into an amorphous phase. The generation of more amorphous segments can promote Li' transport along the interface between OCN sheet and PVDF chains, thereby increasing the Li-ion conductivity of the PVDF/OCN composite polymer electrolyte. The pure PVDF is shown in the lowest trace while the $g-C_3N_4$ nanosheet material is shown in the third from the bottom trace.

2. Ion Conductivity Measurement

Ion conductivity measurement was performed by applying 10 milli Volts (mV) of a voltage bias in a frequency range of about 1 Hertz (Hz) to about 1 mega Hertz (MHz) to the electrolyte membranes Samples 1-3 and the control sample membrane. The measured ion conductivities of the electrolyte membranes at room temperature are shown in FIG. 3 and Table 1.

TABLE 1

|  | Ion conductivity at room temperature (S/cm) |
| --- | --- |
| Sample 1 (2% OCN) | $1.6 \times 10^{-4}$ |
| Sample 2 (5% OCN) | $7.5 \times 10^{-5}$ |
| Sample 3 (10% OCN) | $4.6 \times 10^{-5}$ |
| control sample (0% OCN) | $3.2 \times 10^{-5}$ |

Figure 3:
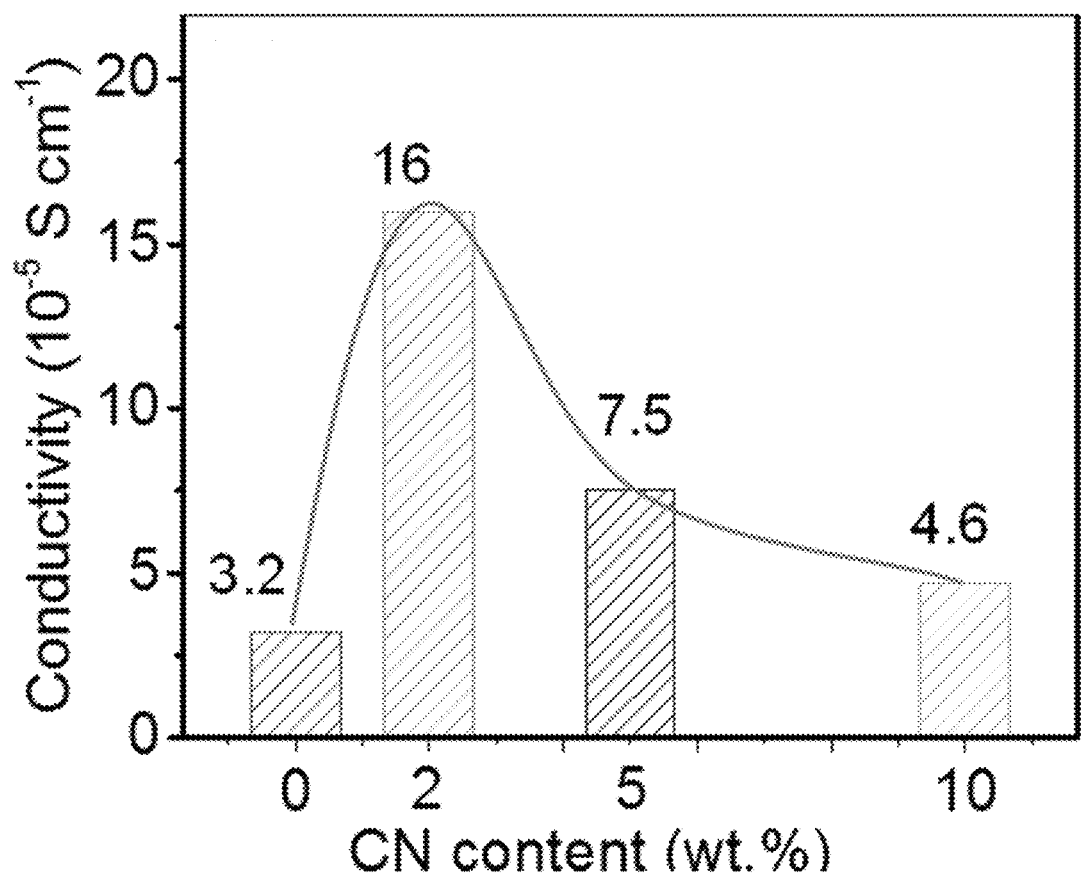
FIG. 3 shows the impedance spectroscopy ionic conductivities of PVDF/LiTFSI/OCN membranes comprising different amounts of OCN.

As shown in Table 1 and FIG. 3, all PVDF/LiTFSI/OCN membranes (Samples 1-3) have a higher Li-ion conductivity than that of the PVDF/LiTFSI membrane, which has 0% OCN nanosheet filler. Specifically, the PVDF/LiTFSI membrane has a low conductivity of $3.2 \times 10^{-5}$ S/cm at room temperature. After introduction of an OCN nanosheet, the composite PVDF/LiTFSI/OCN exhibits a much increased $Li^+$ conductivity. PVDF/OCN with a little amount of 2 wt % OCN possesses a high ionic conductivity of $1.6 \times 10^{-4}$ S/cm at room temperature, which is higher than that of PVDF/OCN with OCN contents of 5 wt % OCN ($7.5 \times 10^{-5}$ S/cm) and 10 wt % OCN ($4.6 \times 10^{-5}$ S/cm).

It can be seen that only a small amount of 2 wt % is enough to make a difference in the composite PVDF/LiTFSI/OCN electrolyte by providing sufficient interfacial active sites for the interactions with polymer matrices. Therefore, the PVDF/LiTFSI/OCN membrane containing 2 wt % OCN exhibits the highest conductivity, while a PVDF/LiTFSI/LLZO membrane in the prior art requires ≥10 wt % LLZO to provide benefits. Furthermore, only a small amount of 2% wt OCN works well to increase the $Li^+$ conductivity. Larger amounts of OCN will decrease the $Li^+$ conductivity because excess OCN tends to self-agglomerate, which dilutes the polymer electrolyte and blocks $Li^+$-transfer at the interface of OCN and the PVDF polymer, and decreases the ionic conductivity of PVDF/OCN polymer electrolyte. The Nyquist plots of the OCN-based PVDF polymer electrolyte confirm the influence of OCN sheet content amount on the ionic conductivity.

Because the OCN nanosheet material is very fluffy and has a high surface area due to its graphene-like planar structure, it provides enough active sites with a PVDF/LiTFSI matrix. The higher surface area of OCN, the stronger the interaction with LiTFSI. The OCN has a strong interaction with $Li^+$, thus promoting the dissociation of LiTFSI and releasing more free $Li^+$. The oxygen atoms can occupy various sites inside the layered structure, resulting in highly diversified OCN structures. The complexity of OCN structures provides plenty of binding sites. The binding energy of lithium ion on $oxy-C_3N_4$ varies from 0 to a few electron voltages. The wide range of binding energy of lithium ion on $oxy-C_3N_4$ can enhance the disassociation of LiTFSI.

3. Ion Transference Measurement

Electrochemical impedance spectroscopy (EIS) was performed on the electrolyte membranes Sample 1 and Control Sample to evaluate electrochemical stability thereof.

Figure 4:
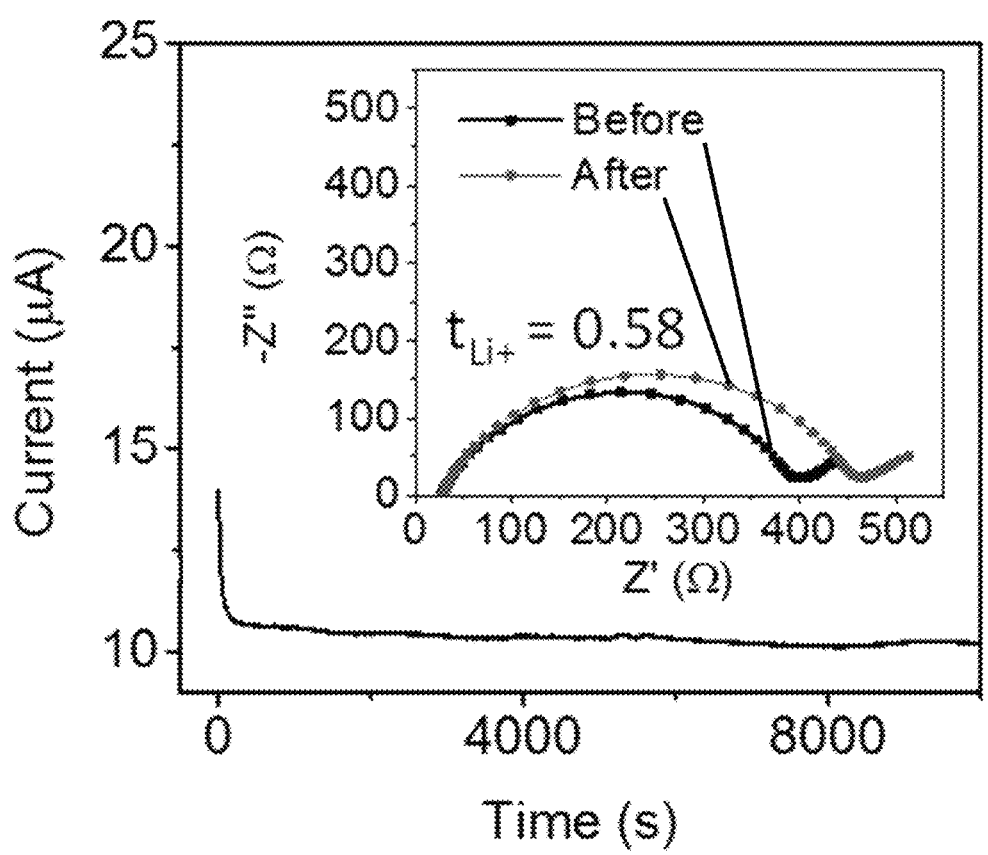
FIG. 4 shows the current-time profile of the Li symmetrical cell with a PVDF/LiTFSI/OCN membrane with 2 wt % OCN; and the inset picture then illustrates the impedance spectra of the PVDF/LiTFSI before addition of the OCN filler and after addition of the OCN filler.

As shown in the inset picture of FIG. 4, the PVDF/LiTFSI/OCN membrane with an amount of 2 wt % OCN, the upper trace labeled "After" has a much higher Li-ion transference number ($tLi^+$) of 0.58 than that of 0.34 for the PVDF/LiTFSI membrane without OCN, the lower trace labeled "Before". This obviously shows that OCN can efficiently free more Li ions.

2D $g-C_3N_4$ nanosheet has a strong interaction with $Li^+$, thus promoting the dissociation of LiTFSI and releasing more free $Li^+$. As a result, addition of 2D $g-C_3N_4$ nanosheet can increase the lithium transference number of PVDF/LITFSI.

4. Linear Sweep Voltammetry (LSV)

Figure 5:
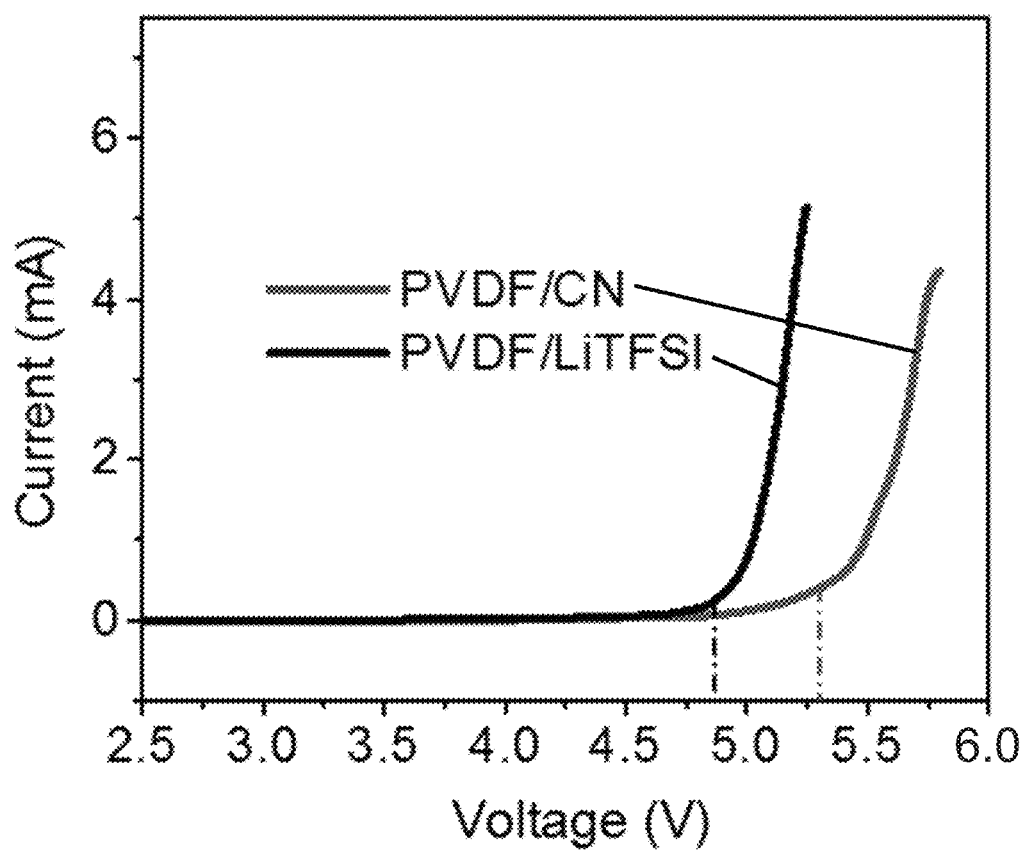
FIG. 5 shows the linear sweep voltammetry curves of the PVDF/LiTFSI membrane and the PVDF/LiTFSI/OCN membrane with 2 wt % OCN.

Linear sweep voltammetry (LSV) was performed on the electrolyte membranes Sample 1 and the Control Sample to evaluate the electrochemical stability thereof. The results are shown in FIG. 5 and Table 2. The LSV was performed at a temperature of about 25° C. in a voltage range of about 2.5 Volts (V) to about 6.0 V (V vs. Li/Li), and a scan rate of about 1 mV/s (milli Volts per second).

TABLE 2

| Sample | Electrochemical Window (V) |
| --- | --- |
| Sample 1 | 5.3 |
| Control Sample | 4.85 |

As shown in Table 2 and FIG. 5, the interaction between OCN and PVDF/LiTFSI also increases the electrochemical window from 4.85V (Control Sample: PVDF/LiTFSI membrane shown in the left most trace) to 5.3V (Sample 1: PVDF/LiTFSI/OCN membrane with 2 wt % OCN shown in the right most trace) by suppressing the anion oxidation.

Since OCN nanosheets have a high surface area of 171 $m^2/g$, the nanosheet structure provides enough active sites with a PVDF/LiTFSI. As verified by density-functional theory (DFT) calculations, OCN nanosheet has a strong interaction with $Li^+$, which facilitates the dissociation of free $Li^+$ from LiTFSI into the mobile PVDF chain segment and thereby leads to a high ionic conductivity and $Li^+$ transference number. In addition, the introduction of OCN nanosheet into PVDF/LiTFSI breaks the regularity of the PVDF chains and converts the structure of PVDF from crystalline into an amorphous phase. The generation of more amorphous segments can promote Li$^+$ transport along the interface between OCN sheets and PVDF chains, thereby increasing the Li-ion conductivity of the PVDF/OCN composite polymer electrolyte. The strong interaction of OCN with PVDF also increases the electrochemical stability of the membrane to a higher voltage, which makes it an ideal electrolyte candidate to pair with a high-voltage cathode.

In conclusion, the addition of OCN nanosheets has several appealing advantages including: (1) reducing the crystallinity degree of the polymer, promoting the segmental mobility; (2) facilitating the disassociation of LiTFSI by trapping Li$^+$ on the OCN with a large surface area; (3) providing a fast path for lithium ions transfer through the tri-s-triazine units of the g-$C_3N_4$. Incorporation of $C_3N_4$ into the PVDF/LiTFSI membrane remarkably increases the Li-ion conductivity, widens the stability voltage, and enhances the lithium transference number.

Example 4. Fire Resistance Characteristics Evaluation of Electrolyte Membrane 1. Fire Resistance Evaluation An ignition test was performed on the electrolyte membranes Sample 1 and Control Sample to evaluate the fire resistance thereof. The results are shown in FIG. 6.

Figure 6:
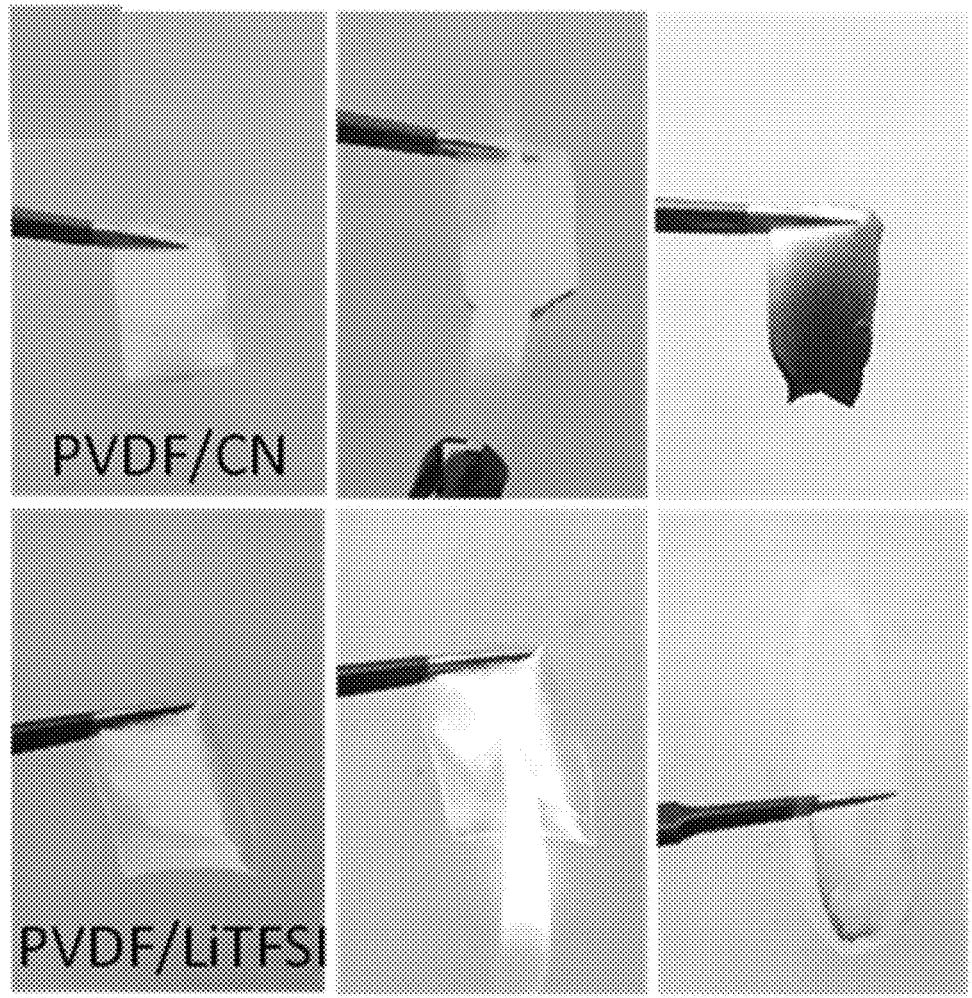
FIG. 6 shows the ignition test of a PVDF/LiTFSI/OCN membrane with 2 wt % OCN (upper row) and of a PVDF/LiTFSI membrane (lower row).

As shown in FIG. 6, the PVDF/LiTFSI membrane (Control Sample) shown in the lower set of panels easily catches fire upon contacting a flame, while PVDF/LiTFSI/OCN membrane (Sample 1: PVDF/LiTFSI/OCN membrane with 2 wt % 2D g-$C_3N_4$ nanosheet) shown in the upper set of panels does not catch fire and only becomes black. It can be seen that incorporation of OCN nanosheet notably improves the fire resistance of the membrane compared to the pristine PVDF/LiTFSI membrane.

2. Thermal Distribution Evaluation

A thermal distribution evaluation was performed on the electrolyte membranes Sample 1 and Control Sample to evaluate the thermal distribution thereof. The results are shown in FIG. 7.

Figure 7:
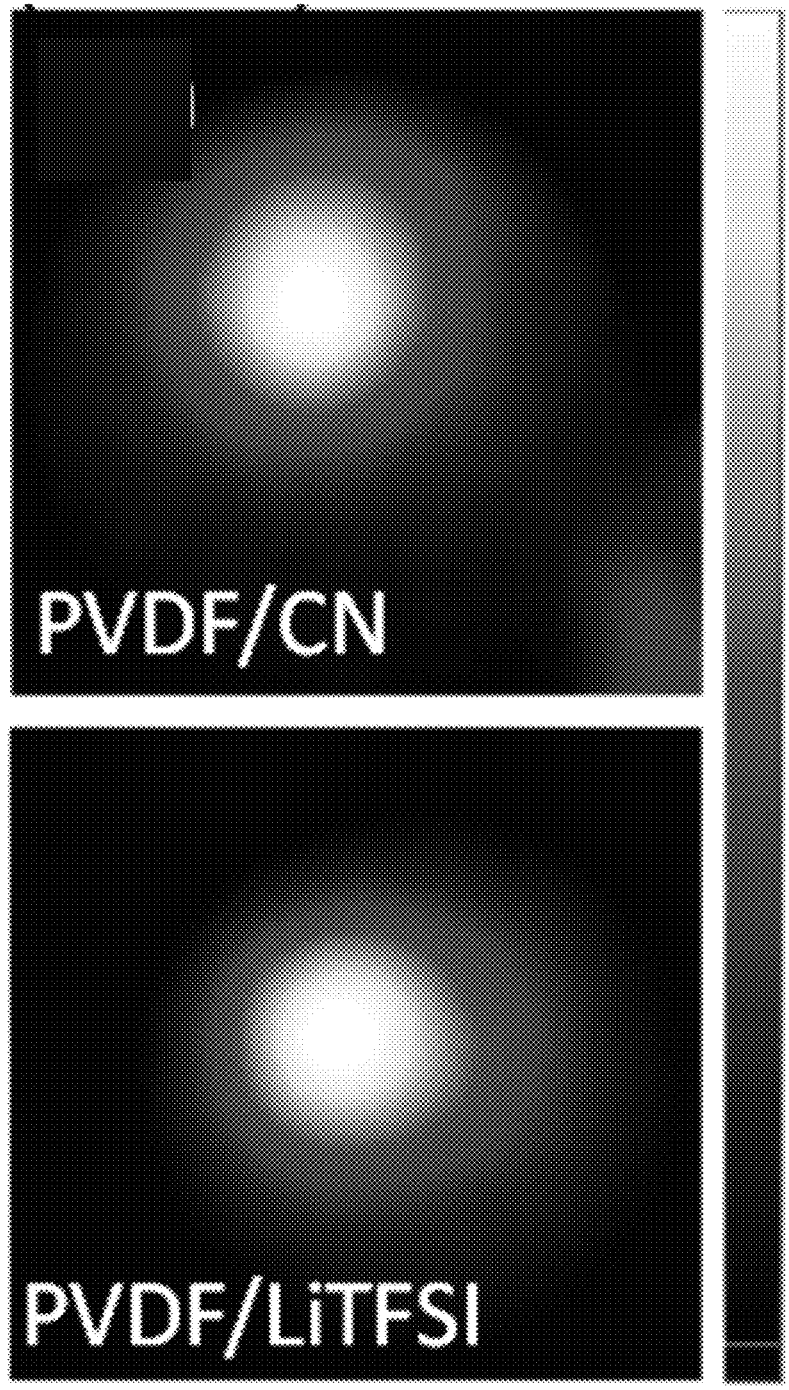
FIG. 7 shows the temperature distribution images of a PVDF/LiTFSI/OCN membrane with 2 wt % OCN (upper row) and of a PVDF/LiTFSI membrane (lower row).

As shown in FIG. 7, the temperature of the PVDF/LiTFSI membrane (Control Sample) shown in the lower box labeled PVDF/LiTFSI at the hotspot spikes to 62° C. while the measured temperature of PVDF/LiTFSI/OCN membrane (Sample 1: PVDF/LiTFSI/OCN membrane with 2 wt % 2D g-$C_3N_4$ nanosheet) is only 45° C., shown in the upper box labeled PVDF/CN. The more uniform thermal distribution may also contribute to the improved fire resistance of PVDF/OCN membrane. It can be seen that the thermal conductive OCN nanosheet also enhances the temperature distribution uniformity of membrane.

Since OCN with a large surface area is known as a good flame retardant and a good thermal conductor, addition of 2D g-$C_3N_4$ nanosheets into the PVDF/LiTFSI significantly improves the fire resistance of electrolyte membrane, the superior thermal conductivity and stability of the OCN endows the PVDF/LiTFSI/OCN membrane with a good fire resistance property.

Example 5. Lithium Metal Ion Battery with the PVDF/LiTFSI/OCN Membrane

This example provides an illustrative lithium metal ion battery which includes the PVDF/LiTFSI/OCN membrane. The skilled in the art should understand that the PVDF/LiTFSI/OCN membrane as provided herein can be used in any suitable solid-state batteries.

The battery of this example comprises: an anode which is a lithium metal electrode; a cathode which is a NMC electrode (LiNi$_{0.8}$Mn$_{0.1}$Co$_{0.1}$O$_2$); and an electrolyte membrane disposed between the anode and the cathode, which is the PVDF/LiTFSI/OCN membrane Sample 1, comprising a PVDF matrix, LiTFSI, and OCN nanosheet (2D g-$C_3N_4$ nanosheet) as the filler at 2% by weight.

Since the addition of OCN nanosheet makes PVDF/LiTFSI/OCN membrane an ideal electrolyte for alkali metal batteries, the introduction of 2D g-$C_3N_4$ nanosheet brings the battery with PVDF-based polymer electrolytes one step closer for commercial application. Preferably in such a battery the electrolyte membrane thickness ranges from 10 to 100 microns thick. This is true for all membranes prepared according to the present disclosure irrespective of what polymer, what alkali metal salt and what level of carbon nitrite nanosheet, oxygenated carbon nitride nanosheet or combination thereof that is used to form the membrane.

The as-assembled symmetric batteries with PVDF/LiTFSI/OCN electrolyte exhibit an exceptional rate capability from 0.05 to 0.4 mA/cm$^2$ for 300 h as well as a long-term cycling stability up to 2500 h at 0.1 mA/cm$^2$ and a capacity of 0.1 mA*h/cm$^2$. In addition, a battery with NMC serving as the cathode and PVDF/LiTFSI/OCN as the electrolyte also showed outstanding electrochemical performances at room temperature, including long-term cycling stability at high rates and at high NMC loadings of 1.8-8.2 mg/cm$^2$.

Figure 8:
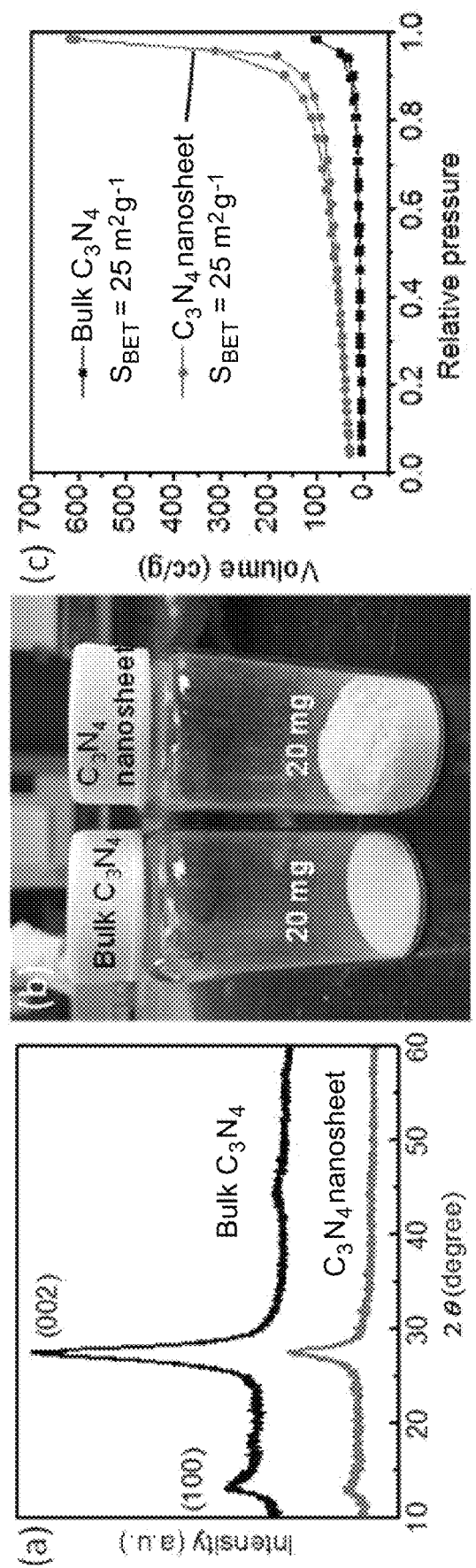
FIG. 8 shows three panels (a), (b) and (c). Panel (a) shows XRD patterns of the bulk $C_3N_4$ and of the nanosheet $C_3N_4$ after exfoliation of the bulk $C_3N_4$ in air. Panel (b) shows a photograph of 20 milligrams of the bulk $C_3N_4$ and of the nanosheet $C_3N_4$ material. Panel (c) shows traces of the N2 adsorption desorption isotherm curves of the bulk $C_3N_4$ and of the nanosheet $C_3N_4$ to test the surface area of each.

FIG. 8, panels (a) to (c) illustrate differences between the characteristics of the bulk $C_3N_4$ and the $C_3N_4$ nanosheet material. In panel (a) the XRD patterns of bulk $C_3N_4$ and the $C_3N_4$ nanosheet material produced after thermal exfoliation of the bulk $C_3N_4$ in air via the sintering process described herein. One sees that the both have a similar crystal structure with two typical peaks (100) and (002); however the $C_3N_4$ nanosheet material has much lower and wider peak intensities indicating that the thermal exfoliation disrupts to a large extent the periodic stacking and structural order of the bulk $C_3N_4$ due to the formation of thin-layer nanosheets. One sees this in panel (b) wherein the $C_3N_4$ nanosheet material, at the same weight of 20 mg, occupies a much larger volume due to it fluffy characteristic. In panel (c) the results of a Brunauer-Emmett-Teller (BET) analysis shows that the nanosheet $C_3N_4$ has a much higher specific surface area of 171 m$^2$/g compared to the bulk $C_3N_4$ at 25 m$^2$/g.

Figure 9:
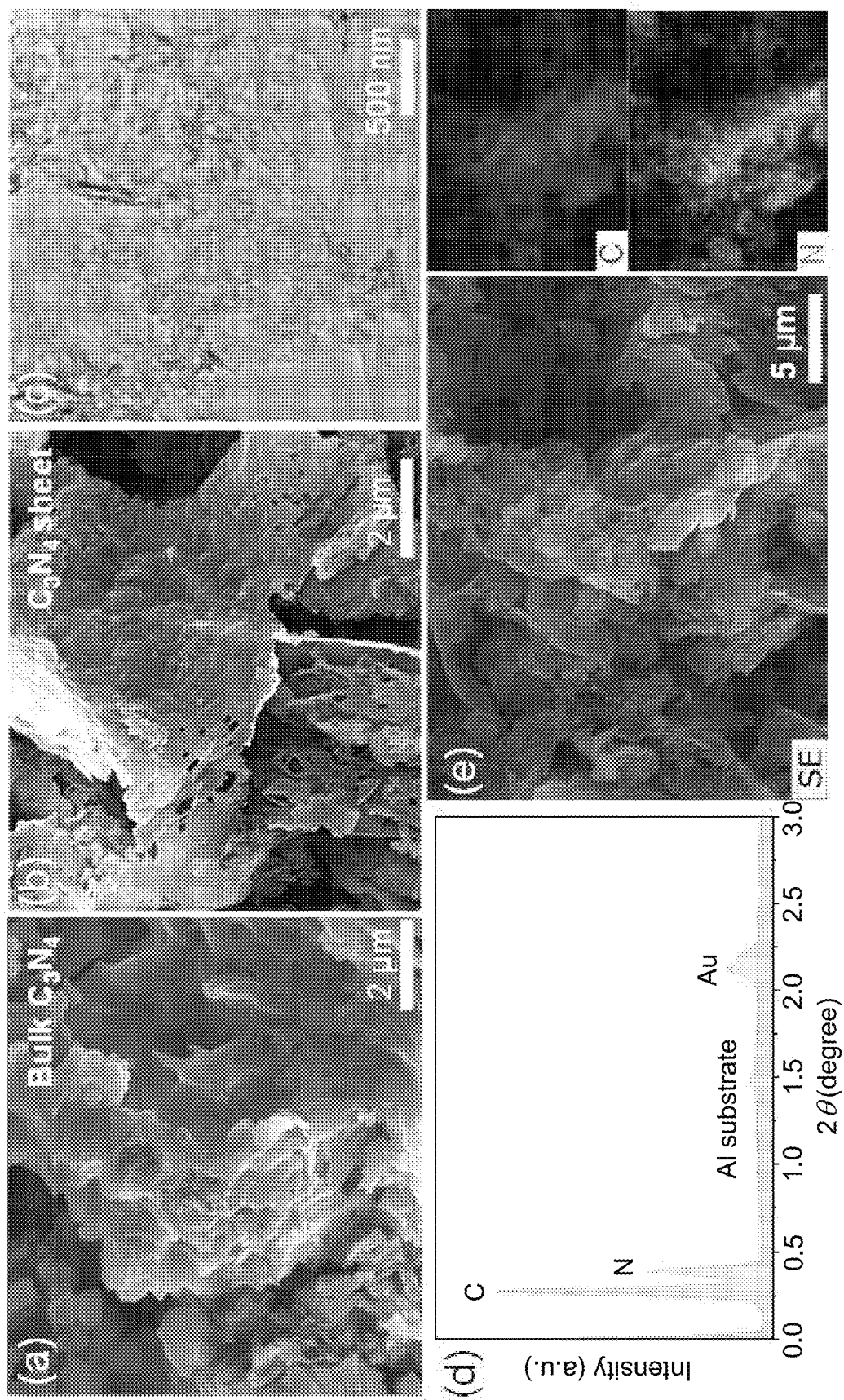
FIG. 9 shows 5 panels (a) to (e) with two subpanels of panel (e). Panel (a) shows an SEM of the bulk $C_3N_4$ material. Panel (b) shows an SEM of the nanosheet $C_3N_4$ material. Panel (c) is a transmission electron microscope (TEM) image of the nanosheet $C_3N_4$ material. Panel (d) is the energy dispersive x-ray spectroscopy (EDX) spectrum of the nanosheet $C_3N_4$ material. Panel (e) is an SEM of the nanosheet $C_3N_4$ material and the subpanels show the distribution of carbon in the top subpanel and nitride in the bottom subpanel from this image.

FIG. 9, panels (a) to (e) and the two subpanels associated with panel (e) illustrate other differences between the bulk $C_3N_4$ and the nanosheet $C_3N_4$. Panel (a) shows an SEM image of the bulk $C_3N_4$ while panels (b) and (c) show SEM and transmission electron microscopy (TEM) images of the nanosheet $C_3N_4$. Panel (d) shows the energy dispersive x-ray spectroscopy (EDX) of the nanosheet $C_3N_4$. Panel (e) shows an SEM image of the nanosheet $C_3N_4$ and the two subpanels shown in the top panel the distribution of C while the bottom subpanel shows the distribution of N in the image. One sees from panel (a) that the bulk $C_3N_4$ shows a dense and thick aggregated morphology following the formation via a thermal condensation of melamine. One then sees in panel (b) that the nanosheet $C_3N_4$ material produced by thermal exfoliation of the bulk $C_3N_4$ has a much different morphology and structure. It does not have the aggregates, instead it is sheet-like and has many pores in the sheets. The TEM image in panel (c) shows the sheet layer is so thin that it is almost transparent to the electron beams. As shown in panel (d) the EDX spectrum only shows C and N elements. As shown in panel (e) and its subpanels the C and N are distributed uniformly on the nanosheet $C_3N_4$.

Figure 10:
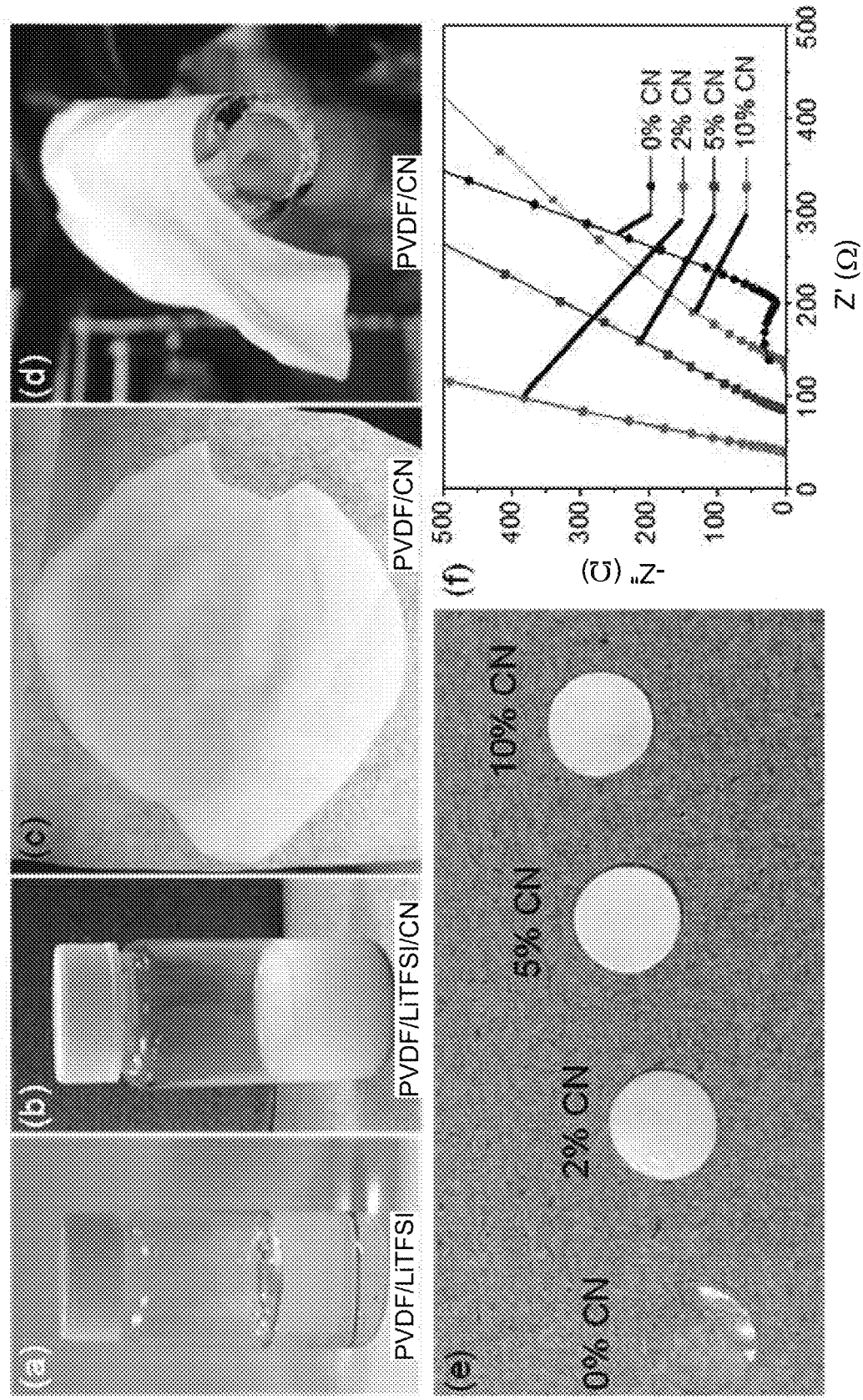
FIG. 10 shows 6 panels (a) to (f). Panel (a) shows a vial of a PVDF/LiTFSI solution. Panel (b) shows a vial of a suspension of PVDF/LiTFSI/CN nanosheet material. Panel (c) shows a electrolyte membrane formed from the material composition in the vial shown in panel (b). Panel (d) shows the membrane of panel (c) wrapped around a glass tube. Panel (e) shows a series of membranes formed from PVDF with differing amounts of the carbon nitride nanosheet filler. Panel (0 shows a series of traces of the room temperature conductivities of membranes having the compositions as shown in panel (e).

FIG. 10 shows a series of panels (a) to (0. In panel (a) is a photograph of a vial of the clear solution of the PVDF/LiTFSI mixture. In panel (b) is a photograph of the PVDF/LiTFSI mixture after addition of nanosheet $C_3N_4$ material to it. In panel (c) a photograph of the membrane collected after evaporation of the solvent from the PVDF/LiTFSI/CN in a vacuum oven at 60° C. for 24 hours. In panel (d) the membrane is rolled around a glass tube demonstrating it flexibility. In panel (e) one sees a series of membranes produced according to the present disclosure containing 0%, 2%, 5% and 10% by weight nanosheet $C_3N_4$ based on the total weight of the conductive polymer. In panel (f) one sees the room temperature conductivities of each of the membranes prepared as shown in panel (e).

Although the illustrative embodiments of the present disclosure have been described and illustrated herein, it would be obvious to those skilled in the art that these embodiments are only for the purpose of illustration. It will be apparent to those skilled in the art that numerous variations, modifications and substitutions can be made to these embodiments without departing from the scope and spirit of the present disclosure. The scope of the present disclosure is defined by the appended claims and the methods and structures as fall within the claims together with the equivalents thereof are intended to be embraced by the appended claims.

What we claimed is:

1. A solid electrolyte membrane for an alkali metal ion battery, consisting of:
    a matrix of at least one ionically conductive polymer;
    an alkali metal salt present in an amount of from 50 to 80% by weight based on the total weight of the ionically conductive polymer; and
    a filler selected from the group consisting of a carbon nitride nanosheet, an oxygenated carbon nitride nanosheet, and combinations thereof, wherein the solid electrolyte membrane has an ionic conductivity of $4.6 \times 10^{-5}$ $Scm^{-1}$ or greater at 25° C. and wherein the alkali metal salt and the filler are distributed throughout the matrix and the at least one ionically conductive polymer has an amorphous structure.

2. The solid electrolyte membrane according to claim 1, wherein the carbon nitride in the carbon nitride nanosheet, the oxygenated carbon nitride nanosheet or the combination thereof is in the form of graphitic carbon nitride g-$C_3N_4$.

3. The solid electrolyte membrane according to claim 1, wherein the filler comprises an oxygenated carbon nitride nanosheet.

4. The solid electrolyte membrane according to claim 1, wherein an amount of the filler is in a range of from about 0.5% by weight to 10% by weight based on the total weight of the ionically conductive polymer.

5. The solid electrolyte membrane according to claim 4, wherein the amount of the filler is in a range of from about 2% by weight to 5% by weight based on the total weight of the ionically conductive polymer.

6. The solid electrolyte membrane according to claim 5, wherein the amount of the filler is about 2% by weight based on the total weight of the ionically conductive polymer.

7. The solid electrolyte membrane according to claim 1, wherein the surface area of the carbon nitride nanosheet, the oxygenated carbon nitride nanosheet, or a combination thereof is greater than 100 $m^2$/g.

8. The solid electrolyte membrane according to claim 7, wherein the carbon nitride nanosheet, the oxygenated nitride nanosheet, or a combination thereof are porous.

9. The solid electrolyte membrane according to claim 1, wherein the ionically conductive polymer comprises at least one of polyvinylidene difluoride (PVDF), polyacrylonitrile (PAN) or polyethylene oxide (PEO).

10. The solid electrolyte membrane according to claim 1, wherein the alkali metal salt is selected from the group consisting of LiTFSI, LiFSI, $LiClO_4$, NaTFSI, NaFSI, and $NaClO_4$.

11. An alkali metal battery, the battery comprising:
    an anode;
    a cathode; and
    a solid electrolyte membrane according to claim 1 placed between the anode and the cathode.

12. The alkali metal battery according to claim 11, wherein the solid electrolyte membrane has a thickness of from about 10 microns to 100 microns.

13. The solid electrolyte membrane according to claim 1, wherein the solid electrolyte membrane is flexible and foldable.

14. The solid electrolyte membrane according to claim 1, comprising the oxygenated carbon nitride nanosheet, wherein the oxygenated carbon nitride nanosheet has been subjected to thermal exfoliation prior to incorporation in the solid electrolyte membrane.

15. The solid electrolyte membrane according to claim 1, wherein the carbon nitride in the carbon nitride nanosheet, the oxygenated carbon nitride nanosheet, or a combination thereof is in non-aggregated form.

* * * * *